UNITED STATES PATENT OFFICE.

CHARLES M. ADAMS, OF ASHLAND, MASSACHUSETTS.

IMPROVEMENT IN FUEL COMPOSITION.

Specification forming part of Letters Patent No. 189,985, dated April 24, 1877; application filed February 8, 1875.

*To all whom it may concern:*

Be it known that I, CHARLES M. ADAMS, of Ashland, in the county of Middlesex and State of Massachusetts, have invented an Improved Fuel, of which the following is a specification:

This invention relates to a new and improved preparation and combination of materials for use as a fuel; and it consists of a new fuel made of the screenings of anthracite coal, kerosene-oil, quicklime, and water, used in proportions as follows: One ton of coal-screenings; two gallons of kerosene-oil; fifty pounds of quicklime; twenty gallons of water.

The lime is first slaked with the water, adding the oil at the same time, when, mixing in the coal dust or screenings, the compound is ready for use.

Having now described my invention, what I claim, and desire to secure by Letters Patent, is—

A composition for fuel, consisting of coal-screenings, kerosene-oil, quicklime, and water, combined in the proportions hereinbefore set forth.

The above specification of my invention signed by me this 15th day of January, 1875.

C. M. ADAMS.

Witnesses:
EDWIN W. BROWN,
GEO. H. EARL.